May 12, 1942.　　　E. M. DREFAHL　　　2,282,648
PORTABLE POWER DRIVEN TOOL OPERATING MACHINE
Filed May 23, 1940　　　2 Sheets-Sheet 1
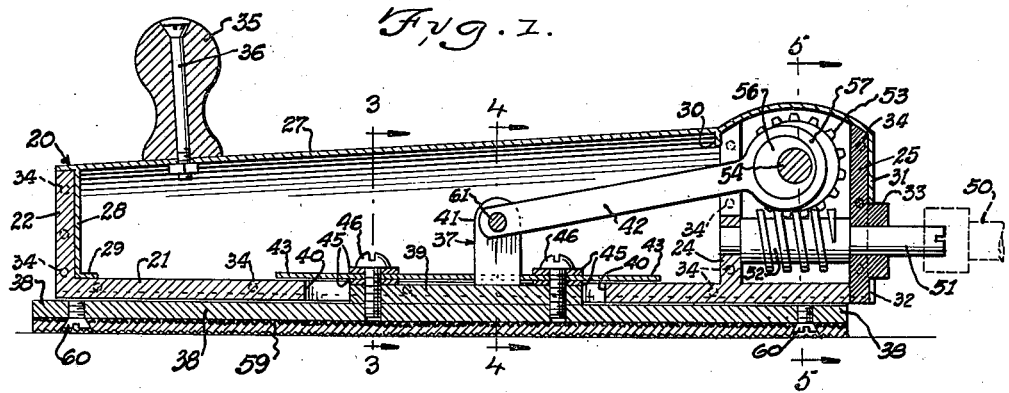
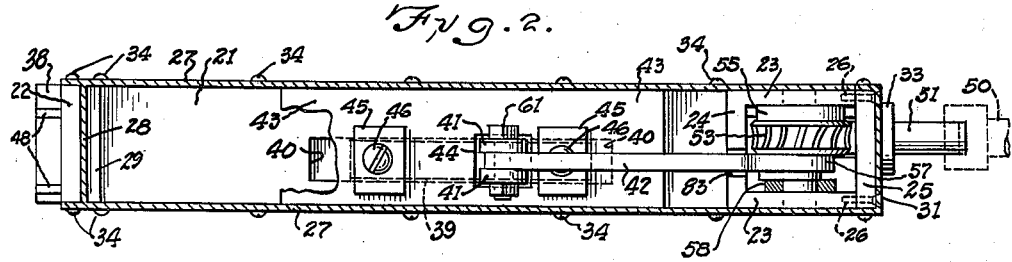
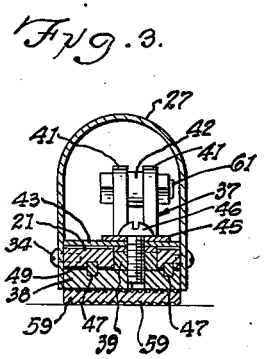 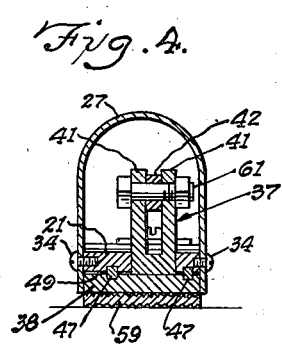 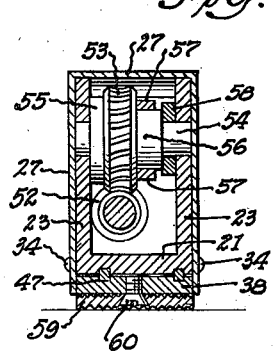
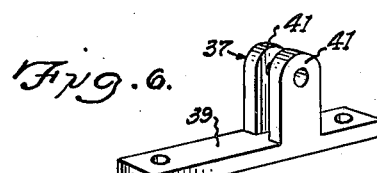
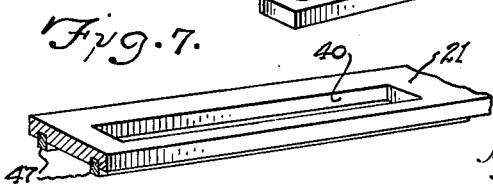
Inventor:
Edward M. Drefahl.
By: Frank Schraeder Jr
Attorney.

May 12, 1942. E. M. DREFAHL 2,282,648
PORTABLE POWER DRIVEN TOOL OPERATING MACHINE
Filed May 23, 1940 2 Sheets-Sheet 2
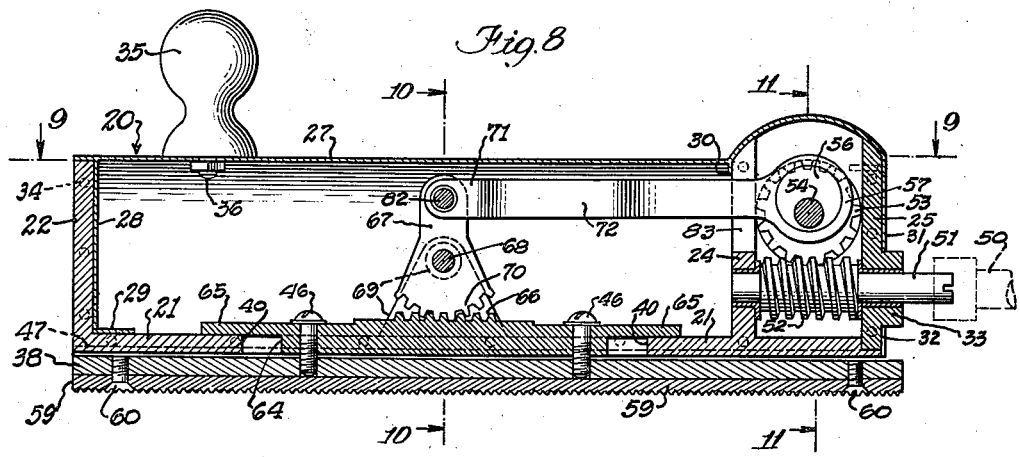
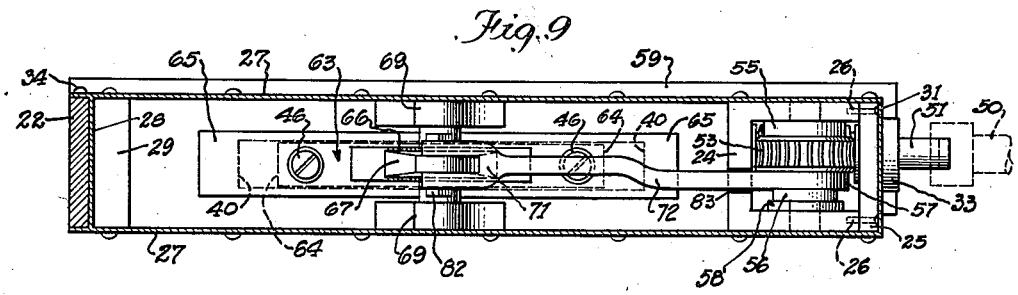
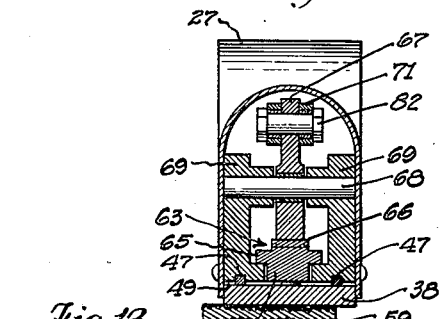
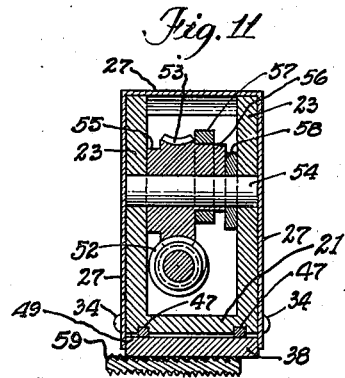
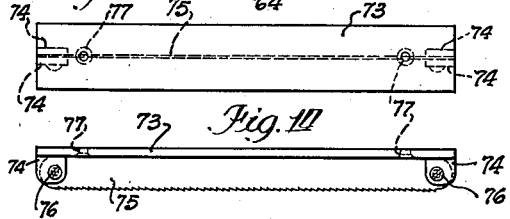
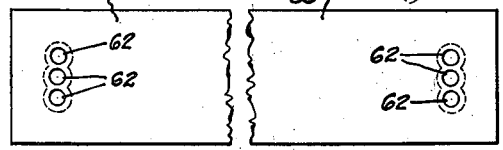

Patented May 12, 1942

2,282,648

UNITED STATES PATENT OFFICE 2,282,648

PORTABLE POWER-DRIVEN TOOL-OPERATING MACHINE

Edward M. Drefahl, Chicago, Ill.

Application May 23, 1940, Serial No. 336,728

3 Claims. (Cl. 29—76)

This invention relates generally to new and useful improvements in portable power-driven tool-operating machines, and has particular reference to a portable power-driven machine which is adapted to impart a reciprocating motion to an abrasive, cutting, polishing, or other similar tool affixed thereto, such as, for example, a file, saw, or elongated polishing element.

The invention is herein illustrated in its application to a portable power-driven file, and has among its objects to provide a handy, portable and compact casing enclosing a novel power-driven mechanism operatively connected to a reciprocatory tool-carrier to which a tool, such as a file, may be readily attached or detached.

Another important object of my invention resides in the construction and arrangement of the mechanism whereby the same may be enclosed in a preferably elongated and comparatively narrow casing to conform to the shape of reciprocable tools such as files, saws or polishing devices, which are usually of elongated and comparatively narrow formation so that any excessive width of the casing of the machine beyond that of the operating tool whereby the center of gravity of the machine is substantially offset relatively to the center of gravity of the tool, functions to a disadvantage to the operator of such machine. I have found that the casing enclosing the tool-operating mechanism and the reciprocating tool-carrier must preferably be substantially of the same width as the tool, or substantially perpendicularly and longitudinally aligned with the tool to provide a balanced machine for facilitating the work.

Another feature or object of my invention is found in the provision of means for attaching a file, or other elongated reciprocatory tool, in offset position transversely relatively to the longitudinal axis of the elongated tool-retaining member, whereby the file, or tool, is so positioned on the casing that a portion of its side extends beyond the adjacent side of the casing to thereby facilitate filing, cutting or polishing surface portions disposed at or within the corners of angularly disposed wall or surface formations.

With the above and other objects in view, my invention consists in the novel combination, construction and arrangement of the parts and members shown in preferred embodiments in the attached drawings, described in the following specifications, and particularly pointed out in the appended claims.

In the drawings, in which like reference characters indicate like or similar parts or members, Fig. 1 is a longitudinal section of a portable power-driven machine embodying my invention and showing the same in its adaptation to a portable power-driven file;

Fig. 2 is a plan view of the machine with parts of the casing in section to show the mechanism;

Figs. 3, 4 and 5 are vertical cross-sections taken respectively on lines 3—3, 4—4 and 5—5 of Fig. 1;

Fig. 6 is a perspective view of the reciprocable operator;

Fig. 7 is a perspective view of a portion of the guide base plate for the reciprocable operator;

Fig. 8 is a longitudinal section of a modification of my invention;

Fig. 9 is a plan view of the modified machine shown in Fig. 8 with portions of the casing in section to show the modified mechanism;

Figs. 10 and 11 are vertical cross-sections taken respectively on lines 10—10 and 11—11 of Fig. 8;

Fig. 12 is a bottom plan view of the machine as illustrated in Figs. 8 to 11 inclusive;

Figs. 13 and 14 are respectively plan view and side elevation of an attachment for adapting the machine to use as a hack-saw; and Fig. 15 is a longitudinal section through a polishing or sanding adaptor.

Referring particularly to Figs. 1 to 7 inclusive, the power-driven tool-operating machine, as shown in these illustrations, includes a casing generally indicated by numeral 20 which consists of a metallic base plate 21 formed with a wall 22, at one end thereof, and a pair of upstanding side walls 23, at the opposite end thereof. The comparatively short upstanding side walls 23 are connected together with a transverse wall 24. The rear end of the casing is closed with a wall 25, which is preferably a separate detachable wall connected to the side walls 23 and base 21, by means of countersunk screws 26, to permit access to the drive mechanism.

The walls 23, 24 and 25 define a supporting wall-enclosure for the drive mechanism.

A substantial metal housing 27, of a general U-shape form, is provided as a cover for the drive mechanism.

The housing 27 has welded thereto a front stiffener wall 28 which is provided with a flange 29 at its lower end and is disposed against the front upstanding wall 22. To prevent displacement, the housing 27 may be formed with an arcuate lip 30 which bears against the upper end of the wall 24, which is also of arcuate shape, and the rear end of the housing 27 is provided with a transverse depending portion 31 for support against the outer face of the rear wall 25. The rear portion 31 is slotted, as at 32, for the projecting bearing-extension 33 formed integrally with the rear wall 25.

The housing 27 is secured to the outer edges of the base 21, and to the walls 22, 24 and 25 by screws 34.

A suitable handle 35 is secured, as by the screw 36, to the top of the housing 27.

The base 21 constitutes a guiding support for the reciprocable operator or member 37 and the reciprocable tool-carrier or tool-supporting plate 38. The lateral extension 39 of the operator 37 is slidably guided in an elongated opening 40 within the base 21. The operator 37 is provided with a pair of upstanding spaced connections 41, for the outer end of the connecting rod 42, which connections 41 are preferably formed integrally with the lateral extension 39.

A cover plate 43, having an opening 44 for the connections 41, is secured with the washers 45 by means of the screws 46 to the top face of the operator extension 39.

The screws 46 also secure the tool-supporting plate 38 to the operator 37 so that both the reciprocating operator 37 and the tool-carrier plate 38 are slidably guided in the slot 40 of the base 21.

As an additional means of guiding for the tool-supporting plate 38, and to reduce frictional resistance between the plate 38 and the base 21, which are preferably both of steel, I provide a pair of phosphor-bronze wearing strips 47 which are securely fitted into the bottom face of the base 21 and extend longitudinally the full length thereof. These wearing strips 47 are engaged within a pair of guide slots 48 which extend longitudinally of the tool-carrier plate 38 but the exposed depending portions of these wearing strips 47 which extend below the bottom face of the base 21 are of a slightly greater depth than the depth of the slots 48 within the top face of the tool-carrier plate 38 so that a small clearance 49 is maintained between the bottom face of the base 21 and the top face of the tool-carrier plate 38 to thus decrease the frictional resistance between these relatively moving faces.

The actuating power for the machine is preferably supplied through a motor driven flexible shaft 50 which is operatively connected with the shaft extension 51 of the worm drive 52. The rotatable ends of the worm drive 52 are suitably supported in the walls 24 and 25.

The worm drive 52 is operatively in mesh with the worm gear 53 which is rotatably mounted on the shaft 54 held in fixed position within the side walls 23.

The worm gear 53 is preferably formed with an integral hub extension 55 to retain same in proper spaced position from one of the walls 23, and, on its opposite side, is preferably formed with an integral hub 56 disposed eccentrically to the axis of the worm gear 53 and the shaft 54. The strap end 57 of the connecting rod 42 embraces the hub 56 so that the connecting rod 42 is thereby given the desired reciprocation. The opposite end of the connecting rod 42 is connected to the operator connections 41 by the bolt 61.

A spacing washer 58 is provided between the eccentric hub 56 and one of the walls 23 to keep the worm gear 53 in proper alignment with the worm drive 52.

As above stated, I have preferred to show the application of my machine to a power-operated file. The file 59, as shown in Figs. 1 and 5, is securely removably attached to the tool-carrier plate 38 by any suitable means, as by the screws 60 which are provided with heads countersunk within the operating face of the file.

The eccentric-driven connecting rod 42 will cause a reciprocation of the operator 37 together with the tool-carrier plate 38 and file 59 which are operatively connected together by the screws 46.

Figs. 8 to 12 inclusive illustrate an embodiment of my invention in a power-driven file machine which is provided with a modified drive mechanism.

All of the parts and members shown in Figs. 8 to 12 inclusive which are like or similar to those shown in Figs. 1 to 7 inclusive bear the same reference numeral, and a repeated description of these like or similar parts and members is deemed unnecessary, hence the following descriptive specification is limited in most instances to those parts and members, shown in Figs. 8 to 12 inclusive, which are different in construction, arrangement or operation from those shown in Figs. 1 to 7 inclusive.

As shown in Fig. 12 the tool-carrier plate 38 is provided with preferably three screw-connection holes 62 at each end thereof; the center hole being disposed on the longitudinal center-line of the plate 38. The standard file 59 is provided with only one connection hole at each on the longitudinal center-line of the file. The file 59 is shown in Figs. 1 to 5 inclusive mounted in axial alignment with the longitudinal axis of the machine and its tool-carrier plate 38 for usual filing operation and the securing screws 60 in this instance extend into the center holes 62.

The relatively offset position of the tool is illustrated in Figs. 9 to 12 inclusive. It is readily apparent from Fig. 12 that the file 59, or other similar tool, may be easily mounted in a position offset relatively to either side of the longitudinal center-line of the tool-supporting plate 38 by simply inserting the screws 60 in either of the pair of longitudinally aligned outer connection holes 62. In such offset mounting of the file 59, or other elongated tool, the file or tool, by reason of its side projection beyond the side of the casing, becomes readily accessible for filing or working of inaccessible corner surfaces disposed between angularly arranged walls or surfaces.

As shown in Figs. 10 and 11, the tool-carrying plate 38 need not necessarily be provided with grooves for the wearing strips 47. The plate 38 may have its face arranged in sliding engagement with the depending wearing strips 38 and spaced from the bottom face of the base 21.

The reciprocable operator or member 63 consists of a lower portion 64 which is slidably mounted in the slot 40 of the base 21 and its upper portion is increased in width and length, as at 65, for sliding support on the upper face of the base 21. The operating member 63 is provided with a tooth rack 66, the teeth of which may be formed integrally with the portion 65.

The operating reciprocable member 63 is secured to the tool-carrier plate 38 by the screws 46.

Reciprocating motion is imparted to the operating member 63, tool-carrier plate 38, and the file 59, by means of a segmental gear arm 67 which is pivotally mounted upon shaft 68 supported in the upstanding bearings 69 which are preferably formed integrally with the cast steel base 21.

The segmental gear arm 67 is provided with a segmental gear 70 which is in mesh with the tooth rack 66 of the operator 63.

The segmental gear arm 67 is operatively connected by bolt 82 to the forked end 71 of the connecting rod 72 which is arranged to be reciprocated by the mechanism shown in Figs. 8, 9 and 11 of similar construction to that above described.

It will now be readily apparent that the reciprocation of the connecting rod 72 will cause oscillation of the segmental gear arm 67 which will simultaneously impart the desired reciprocation to the operating member 63 and the tool-carrier 38 and file 59 connected thereto.

The connecting rods 42 and 72 extend in each case through the slot 83 in wall 24.

The hack-saw supporting attachment illustrated in Figs. 13 and 14 consists of a flat elongated member 73 provided with a pair of spaced integral depending connections 74 at both ends thereof between which a hack-saw 75, or other tool, may be secured, as by the bolts 76. The flat elongated member 73 is provided with a pair of connection holes 77 adapted to receive the securing screws 60 for connection with a pair of the connection holes 62 of the tool-carrier plate 38.

The polishing or sanding attachment, shown in Fig. 15, consists of a plain faced flat elongated member 78 having preferably rounded ends 79, about which may be trained any suitable band 80 of emery cloth, sand paper or polishing fabric.

The attachment is provided with a pair of countersunk connection holes 81 for the securing screws 60.

Since the pair of connection holes 77 in the attachment shown in Figs. 13 and 14, and the pair of holes 81 in the attachment shown in Fig. 15 are in both instances disposed on the longitudinal centers of the attachments, both of these attachments may be secured to the tool-carrier plate 38 in longitudinal alignment or in relatively offset positions.

Attention is called to the following distinctive features of my invention which enhance the efficiency of operation and facilitate the handling of the machine:

(1) The machine is so designed that the complete operating mechanism is enclosed in an elongated casing the length and width of which conforms substantially to the length and width of the file or abrasive tool supported on and reciprocated by the machine so that the weight of the machine and the pressure applied by the operator are substantially uniformly distributed on the tool.

(2) The operating mechanism and flexible drive shaft connection at the rear end of the machine tend to counterbalance the pressure applied on the handle at the front end of the machine.

(3) The flat face of the tool-supporting member or plate supports the entire face area of the file, abrasive, or polishing tool, and this obviates any tendency of the tool to bend or arch during operation so that a true flat working face of the tool is applied to the work.

(4) Provision is made for connecting the flat elongated tool in a slightly laterally transversely offset position relatively to the longitudinal axis of the machine. This feature, as above pointed out, permits the working of surfaces in corners formed by angularly disposed adjacent walls.

(5) The connecting rod is always positioned parallel and close to the longitudinal axis of the casing and reciprocates in opposite directions which are parallel to the longitudinal axis of the machine and parallel to the reciprocating movement of the tool, thus harmonizing the driving forces with the working forces of the tool.

Various obvious changes in the preferred constructions shown may be readily made by those skilled in the art upon perusal of the attached drawings and specifications, without departing from the spirit of my invention defined in the appended claims, hence I do not wish to be understood as limiting myself to the exact details of construction shown in the attached illustrative drawings.

I claim as my invention:

1. A portable file adapted for connection with a flexible power-driven shaft comprising an elongated relatively narrow base plate provided with an elongated slot therein, a pair of relatively narrow elongated transversely spaced strips secured to and extending longitudinally of the bottom face of said base plate, the lower portions of said strips extending below the bottom face of said base plate, narrow elongated file-carrier plate reciprocable below said base plate and having a pair of spaced elongated slots into which said pair of spaced strips extend for slidably guiding and retaining said file-carrier plate a spaced distance below the bottom face of said base plate, a reciprocable member connected to said file-carrier plate, reciprocable within said slot of said base plate, slidably supported upon the top face of said base plate and having a connection through which said member is reciprocable, a pair of upstanding spaced side walls on the rearward end of said base plate, a transverse shaft extending transversly of said base plate supported on said spaced side walls, an upstanding transverse wall on the forward end of said base plate, an intermediate upstanding transverse wall extending across the forward ends of said side walls, an upstanding transverse end closure wall detachably secured to the rear ends of said side walls, a drive shaft extending longitudinally of said base plate and rotatably supported on said intermediate and end closure walls, a worm on said drive shaft, a worm gear on said transverse shaft in mesh with said worm on said drive shaft, an eccentric on said transverse shaft formed integrally with said worm gear, a connecting rod disposed parallel to the longitudinal center-line of said base plate having one end pivotally connected to said reciprocable member connection and its opposite end operatively connected to said eccentric, said connecting rod extending through a slot in said intermediate transverse wall, an elongated housing of inverted U-shaped cross-section removably connected to and supported on said transverse walls and having its lower side marginal portions removably secured to the side edges of said base plate, a handle secured to the top of said housing near its forward end, and a flat file removably secured to the bottom face of said file-carrier plate, the width and length of said base plate, said file-carrier plate, and said flat file being substantially equal.

2. A portable file as embodied in claim 1 wherein said connection of said reciprocable member consists of a toothed rack on said reciprocable member, a pair of spaced upstanding bearings on said base plate, a transverse pivot shaft supported on said bearings, and an upstanding arm pivotally supported on said pivot shaft, said arm having an integral segmental gear at its lower end in mesh with said toothed rack and its upper end pivotally connected to said connecting rod.

3. A portable file as defined in claim 1 including connection means for mounting said file in slightly transversely offset position relatively to the file-carrier plate whereby the longitudinal center-line of the file may be offset relatively to either side of the longitudinal center-line of the file-carrier plate so that a longitudinally extending side portion of the file extends outwardly beyond one side of the file-carrier plate.

EDWARD M. DREFAHL.